(12) United States Patent
Roberts et al.

(10) Patent No.: US 7,862,270 B1
(45) Date of Patent: Jan. 4, 2011

(54) METHOD AND APPARATUS FOR RESTRAINING CARGO

(75) Inventors: Daniel S Roberts, Hartsville, SC (US); David Craig Dorn, Hartsville, SC (US); Mike Mersberger, Sheboygan Falls, WI (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 12/573,245

(22) Filed: Oct. 5, 2009

Related U.S. Application Data

(60) Provisional application No. 61/185,628, filed on Jun. 10, 2009.

(51) Int. Cl.
*B60P 7/135* (2006.01)
(52) U.S. Cl. .................................... 410/121
(58) Field of Classification Search ............ 410/121, 410/127, 128, 129, 130, 131, 140; 296/24.4; 220/529, 534
See application file for complete search history.

(56) References Cited

U.S. PATENT DOCUMENTS

| | | | | |
|---|---|---|---|---|
| 2,972,490 A * | 2/1961 | Styx | .......................... | 410/97 |
| 3,025,804 A * | 3/1962 | Bruning | ...................... | 410/129 |
| 3,177,007 A * | 4/1965 | Oren | .......................... | 410/121 |
| 3,494,301 A * | 2/1970 | Sause, Jr. | ...................... | 410/121 |
| 3,583,333 A * | 6/1971 | Matyas | ........................ | 410/134 |
| 3,762,341 A * | 10/1973 | Adler | ........................ | 410/103 |
| 3,779,174 A * | 12/1973 | Doyle et al. | .................. | 410/121 |
| 3,866,544 A * | 2/1975 | Rothell | ........................ | 410/129 |
| 4,009,792 A * | 3/1977 | Sano et al. | ................... | 414/512 |
| 4,010,848 A * | 3/1977 | Pater et al. | ................... | 206/448 |
| 4,056,066 A * | 11/1977 | Homanick | ..................... | 410/66 |
| 4,167,144 A * | 9/1979 | Martin et al. | ............... | 410/117 |
| 4,168,667 A * | 9/1979 | Loomis | ...................... | 410/118 |
| 4,199,297 A * | 4/1980 | Abolins | .................... | 414/525.6 |
| 4,265,577 A * | 5/1981 | Loomis | ...................... | 410/118 |
| 4,436,466 A * | 3/1984 | Marino | ........................ | 410/118 |
| 4,743,151 A * | 5/1988 | Haberkorn | .................. | 410/121 |
| 4,878,635 A * | 11/1989 | Nordstrom | ............... | 244/137.1 |
| 5,186,596 A * | 2/1993 | Boucher et al. | ............. | 414/395 |
| 5,338,015 A * | 8/1994 | Liegel et al. | .................. | 269/71 |
| 5,370,482 A | 12/1994 | Long | | |
| 6,431,804 B1 * | 8/2002 | Wetzig, III | ................... | 410/94 |
| 6,524,043 B2 | 2/2003 | Earle et al. | | |
| 6,939,096 B1 | 9/2005 | Cline et al. | | |
| 7,121,778 B2 * | 10/2006 | Dockery | ..................... | 410/121 |
| 7,192,009 B2 | 3/2007 | Massey | | |
| 7,360,978 B2 | 4/2008 | Howes | | |
| 7,445,412 B2 * | 11/2008 | Nelson et al. | ............... | 410/130 |
| 7,476,070 B1 | 1/2009 | Abato, Jr. | | |

* cited by examiner

*Primary Examiner*—H Gutman
(74) *Attorney, Agent, or Firm*—Miller Matthias & Hull, LLP

(57) ABSTRACT

A method and apparatus for restraining cargo in a trailer is provided. The apparatus has four components: a mobile cargo stop, a chain, means for anchoring the chain to the trailer floor near the trailer front wall, and a front wall liner mounted to the trailer front wall. The chain runs from the anchoring means near the trailer front wall, under the cargo, and is affixed to the cargo stop with a turnbuckle hook. The cargo is restrained between the front wall liner and the cargo stop by tightening the chain using a cinching device mounted on the cargo stop.

9 Claims, 5 Drawing Sheets

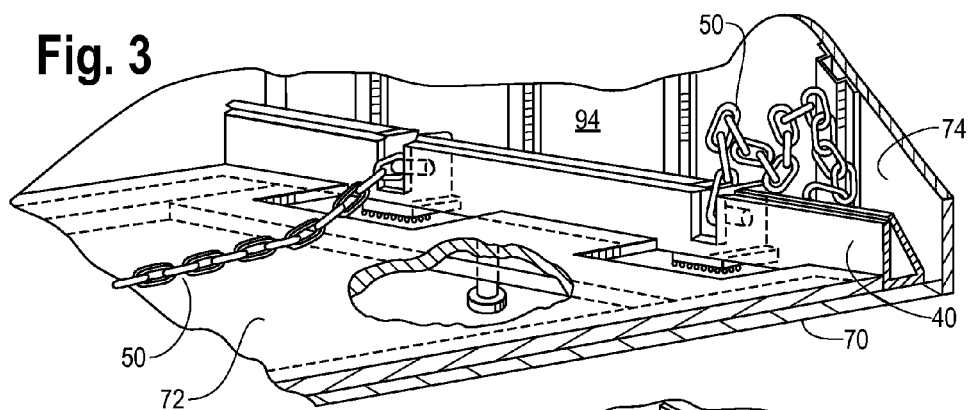
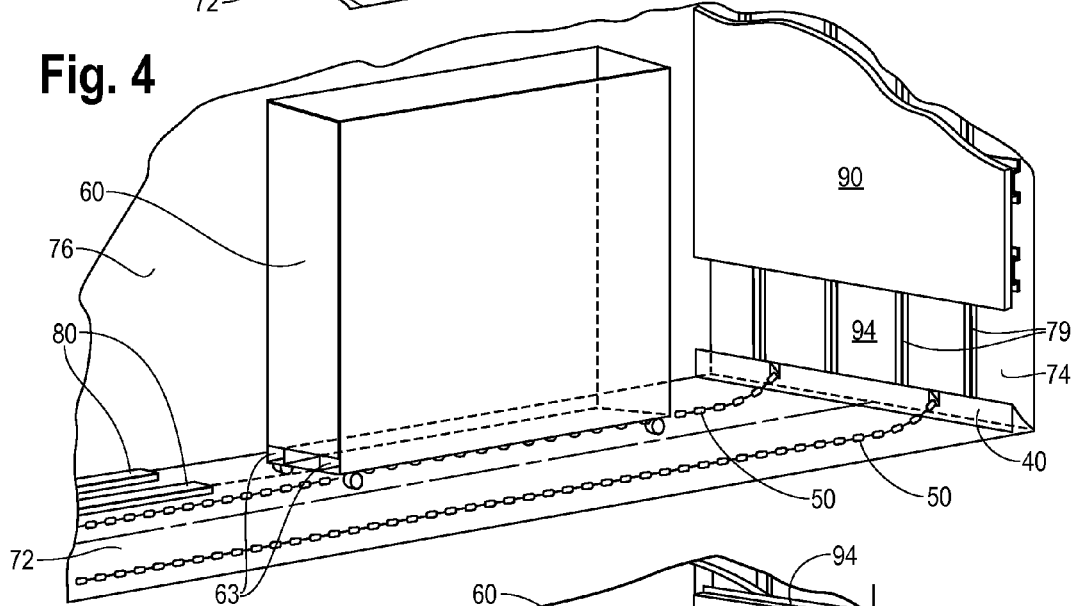
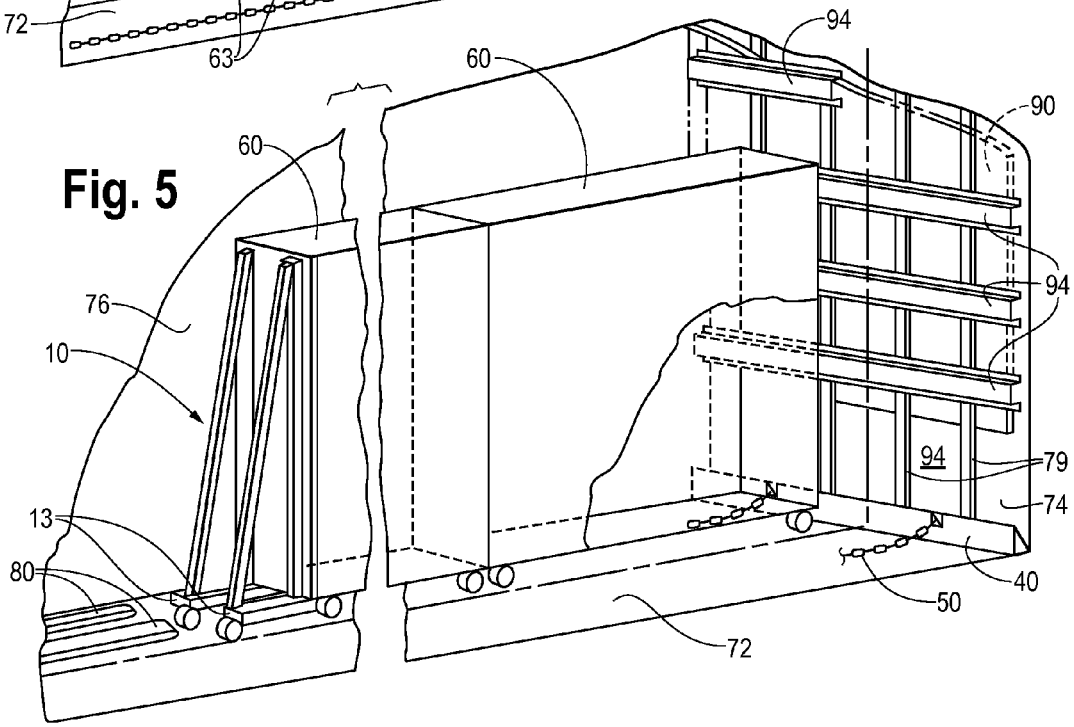

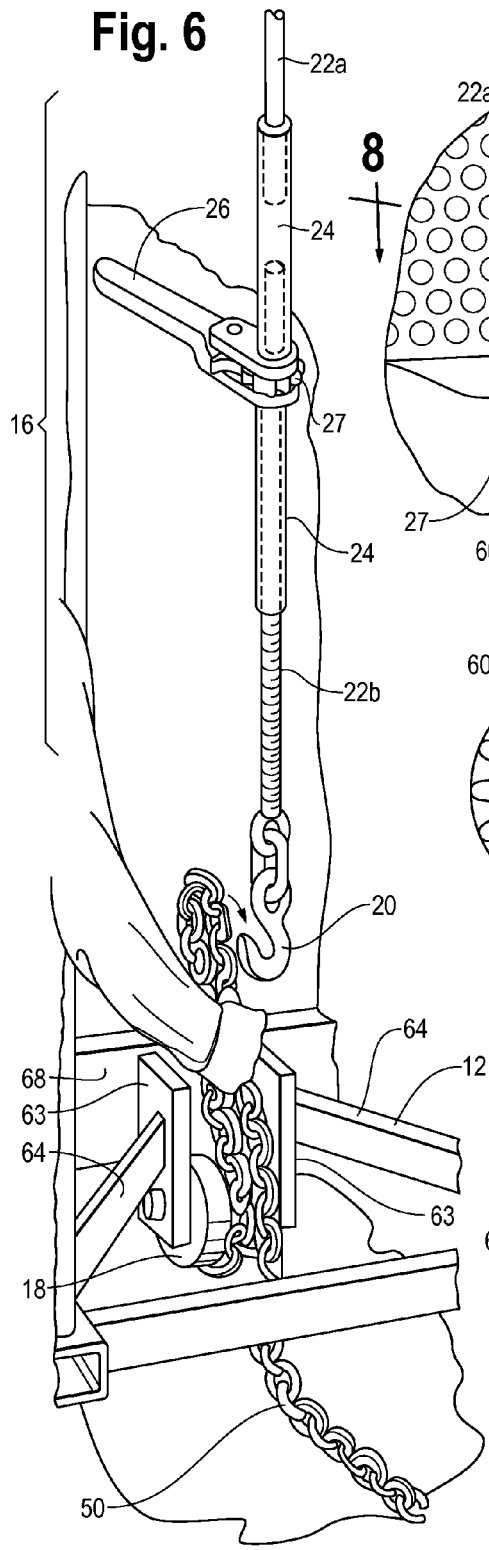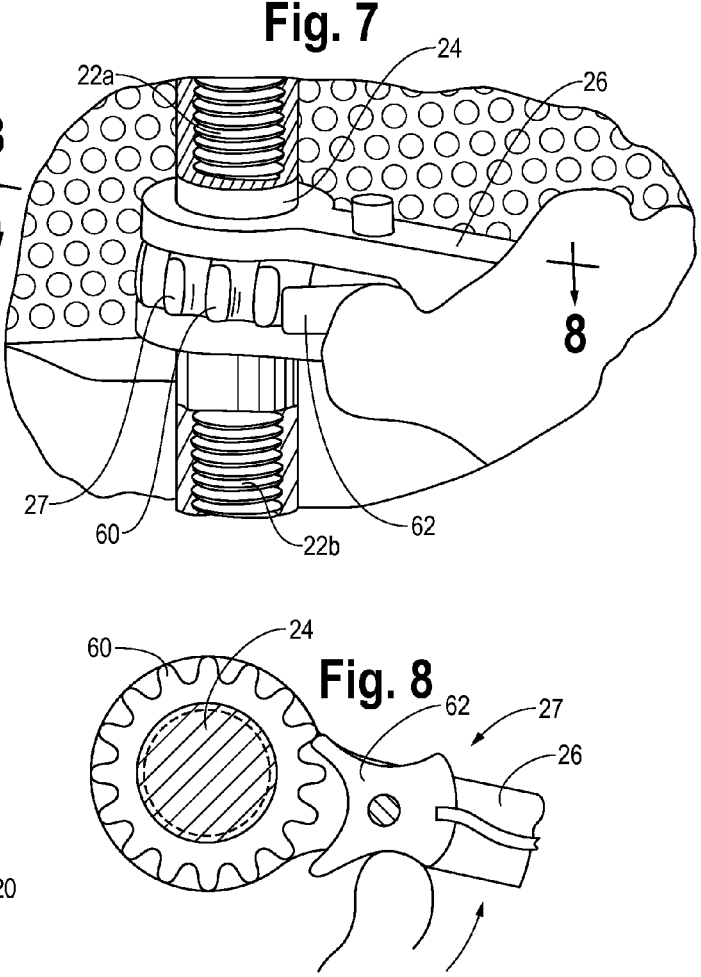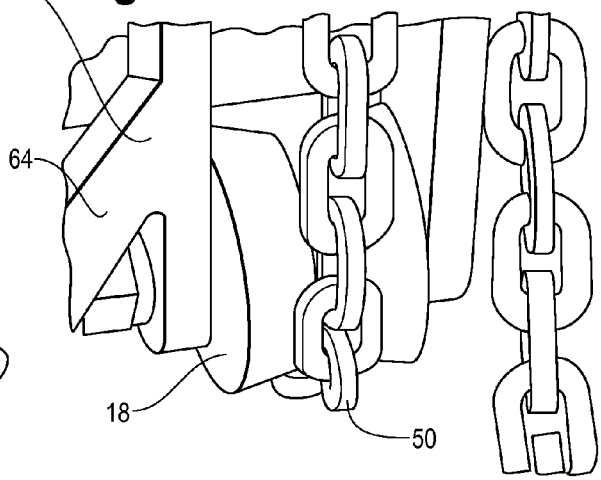

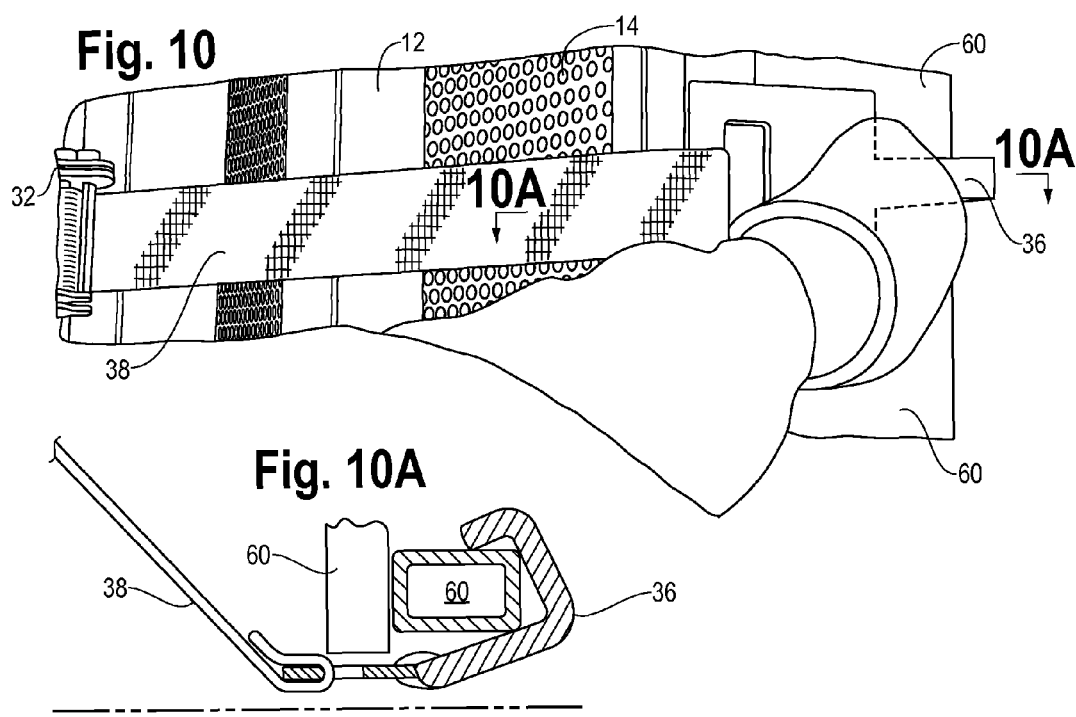
Fig. 10
Fig. 10A
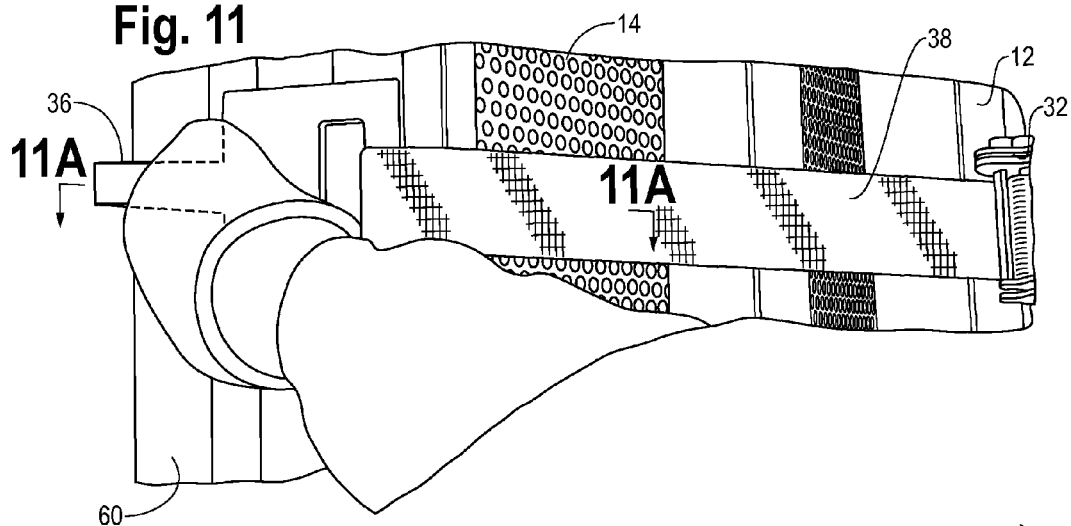
Fig. 11
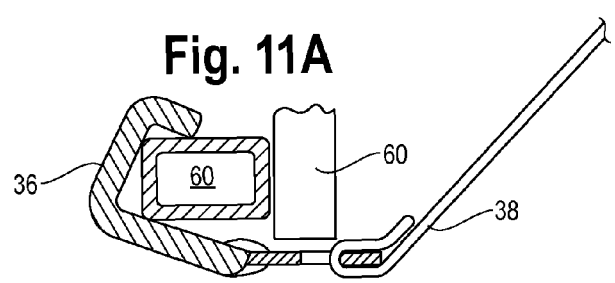
Fig. 11A

METHOD AND APPARATUS FOR RESTRAINING CARGO

BACKGROUND

1. Field Of The Invention

This invention relates to a method and apparatus for restraining cargo. More particularly, this invention relates to a method and apparatus for restraining wheeled carts and other cargo transported by trailers.

2. Description Of The Related Art

Trailers and semi-trailers (collectively "trailers") are used to haul cargo over long distances. Full trailers have front and rear axles and are coupled to a towing truck by a drawbar. Semi-trailers ("semis" for short) lack a front axle and so must be supported by legs ("landing gear") when not coupled to a towing truck, typically by a fifth wheel coupling. The fifth wheel coupling is a large flat plate bolted to the rear truck chassis on which the semi-trailer rests and pivots.

A typical trailer has a rectilinear interior or compartment defined by a front wall or bulkhead, side walls, a ceiling, floor and rear doors. The interior walls and floor may be lined with plywood, hardwood or any other suitable material and reinforced with posts or beams. The rear doors may be sliding doors, swinging doors or any other suitable door or doors.

The cargo, whether it be large individually packaged products or smaller products packaged in groups, must be secured within the trailer compartment to prevent damage to the cargo or, worse, cargo falling from the vehicle. Numerous means have been developed and used over the years for restraining cargo within a trailer, including tie down straps and chains (U.S. Pat. Nos. 5,302,064 and 7,476,070), cross bars and rods (U.S. Pat. No. 5,370,482), partitions (U.S. Pat. No. 7,445,412), adhesive restraining strips (U.S. Pat. No. 6,089,802) and expandable gates (U.S. Pat. No. 6,939,096).

With the adoption in 2004 by the Federal Motor Carrier Safety Administration ("FMCSA") of stricter cargo restraining rules, motor carriers have been exploring alternate ways for restraining cargo that comply with the new rules, assure worker safety and protect the cargo being transported. Under the new rules, cargo must be immobilized or secured in accordance with general securement rules or commodity-specific securement rules. These securement rules provide that the cargo securement systems must withstand forces caused by trailer deceleration in the forward direction and acceleration in the rearward and lateral directions. Deceleration is the rate at which vehicle speed decreases as the brakes are applied, and acceleration is the rate at which vehicle speed increases in the lateral (sideways) direction when the vehicle is turning, or in the rearward direction when the vehicle is being driven in reverse and makes contact with a loading dock. Deceleration/acceleration forces are commonly measured as a percentage of the force of gravity (g), where 1 g equals 32.2 feet/second/second, or 32.2 ft/sec$^2$. The FMCSA requires that cargo securement systems be capable of withstanding the forces associated with three deceleration/accelerations: (1) 0.8 g deceleration in the forward direction; (2) 0.5 g acceleration in the rearward direction; and (3) 0.5 g acceleration in the lateral direction.

The present invention is intended to fulfill these objectives by providing an improved method and apparatus for restraining cargo, particularly wheeled carts, being transported in trailers.

More particularly, it is an object of the present invention to provide a cargo securement system that can secure wheeled carts having up to 42,400 lbs. per load.

Another object of the present invention is to provide a cargo securement system that decreases loading and unloading times.

Further and additional objects will appear from the description, accompanying drawings, and appended claims.

SUMMARY OF THE INVENTION

The present invention is a method and apparatus for restraining wheeled carts in a trailer. The apparatus has three major components: a mobile cargo stop, a chain, and means for anchoring the chain to the trailer floor near the trailer front wall. A fourth component, a front wall liner, may be mounted to the trailer front wall for cushioning and reinforcement. At its most basic, the system works by wedging carts full of cargo between a the cargo stop and the trailer front wall by tightening the chain that runs from its anchoring position near the front wall to the cargo stop to which the chain is secured by a hook.

The cargo stop comprises a frame, a back stop mounted on the frame, and a device mounted on the frame for cinching (tightening) the chain. The frame is mounted on wheels or casters so the cargo stop can be lifted into the trailer with a forklift truck and easily moved into position behind the row of carts to be restrained. The cinching mechanism comprises a turnbuckle hook, a pair of vertically aligned, threaded rods connected by a turnbuckle, and a two way or reversible ratchet mechanism for raising and lowering the turnbuckle hook. The turnbuckle hook 20 is suspended from the lower rod. The upper threaded rod is connected to the top of the frame. The turnbuckle is threadably connected to both portions of the threaded rod and can be rotated to raise or lower the turnbuckle hook, thereby tightening or loosening the chain.

The system can be operated in the following manner. First, the chain is pulled from its place of anchor at the front of the trailer until it extends a substantial distance from the front wall. Next, the carts are loaded onto the trailer and positioned so that they form a longitudinally aligned row of carts with the chain extending under each cart. The carts should be nested (placed close together) in front to back fashion.

Next the cargo stop is positioned so that it is aligned with the row of carts and the chain is centered underneath the cargo stop. The operator hooks the chain over the turnbuckle hook and then tightens the chain until the carts are snugly restrained between the trailer front wall and the cargo stop.

DESCRIPTION OF THE DRAWINGS

FIG. 3 is a close up perspective view of the angle bar of FIG. 1.

FIG. 4 is a perspective view of a wheeled cargo cart being moved into position inside a trailer.

FIG. 5 is a perspective view of multiple cargo carts after they have been loaded onto a trailer and wheeled into position, the forward-most cart being shown in partial cutaway view.

FIG. 6 is a close up perspective view of a chain cinching device, including ratchet mechanism, which is part of the cargo stop of the present invention.

FIG. 7 is a close up perspective view of the ratchet mechanism of FIG. 6.

FIG. 8 is a top view of the ratchet mechanism of FIG. 7 taken along line 8-8.

FIG. 9 is a close up perspective view of a pulley used in the chain cinching device of FIG. 6.

FIG. 10 is a close up perspective view of the right side securement means of the cargo stop of FIG. 2 shown being secured to a cargo cart.

FIG. 10A is a top view of the right side securement means of FIG. 10 taken along line 10A-10A.

FIG. 11 is a close up perspective view of the left side securement means of the cargo stop of FIG. 2 shown being secured to a cargo cart.

FIG. 11A is a top view of the left side securement means of FIG. 11 taken along line 11A-11A.

DETAILED DESCRIPTION OF THE INVENTION

Figure 1:
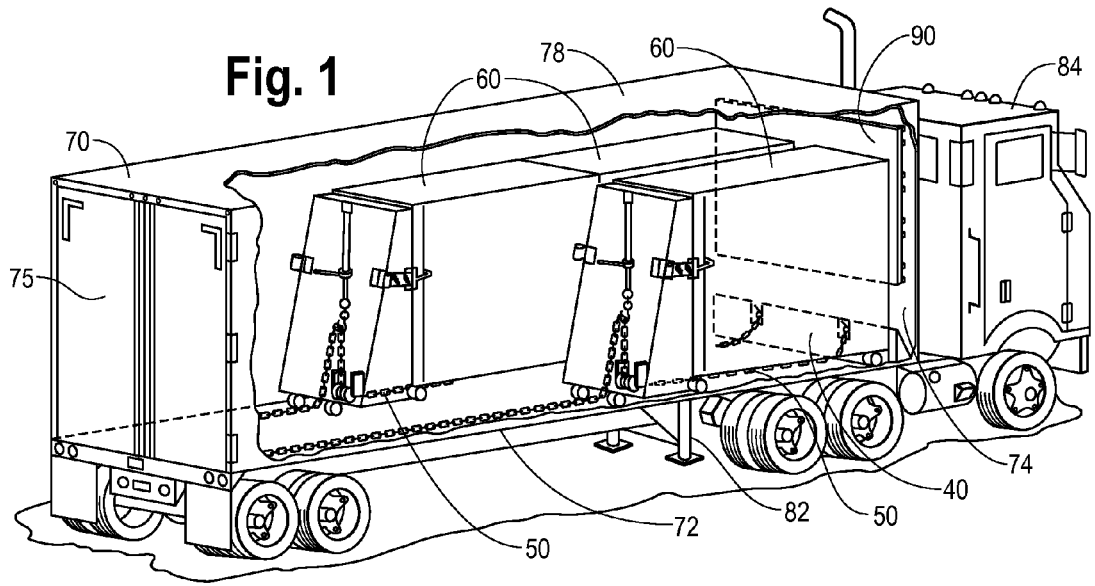
FIG. 1 is a perspective view a cargo restraining system according to the present invention, including a (stylized) cargo stop, a chain, an angle bar and a front wall lining, shown inside a trailer.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiment(s).

Turning to the drawings, there is shown in FIG. 1 one embodiment of the present invention, an apparatus for restraining cargo within a trailer 70. The trailer comprises a floor 72, front wall or bulkhead 74, rear doors 75 and side walls 76 which, along with the trailer ceiling 78 define the trailer compartment or interior space. In the illustrated embodiment the trailer is a semi-trailer and includes front legs 82 for supporting the trailer when it is disengaged from the truck 84.

The cargo can be any suitable cargo, but the invention is particularly adapted to secure wheeled carts 60 for carrying product. Wheeled carts 60 are prone to movement during shipping and must be secured tightly to prevent damage to the product and to assure worker safety. The carts are shown stylistically in FIG. 1 as a series of wheeled carts 60 aligned within the trailer compartment in two longitudinal (front to back) rows. In one form the carts 60 are upright structures, each comprising a wheel-mounted platform or base and a metal frame or superstructure a vertical upright located at each corner of the platform and a rectangular top frame. Product such as tubes, rods, cones and the like can be stacked on the platform and secured within the cart frame by film wrapping. Although the invention will now be described with respect to this type of wheeled cart 60, it should be understood that the invention can be used with many other types of carts and cargo.

The cargo restraining apparatus of the present invention has three main components: a mobile cargo stop 10 (shown in stylized fashion in FIG. 1 and in more detail in FIG. 2), a means 50 for tethering (fastening) the cargo stop 10 to an anchoring means at the front of the trailer 70, and the anchoring means itself, which in the illustrated embodiment is an angle bar 40. The angle bar 40 preferably is anchored to the trailer floor 72 near the trailer front wall 74, but may also be affixed to the trailer bulkhead 74 or side walls 76. A fourth, optional, component, a front wall liner 90, may be mounted to the trailer bulkhead or front wall 74 for reinforcement and cushioning.

The tethering means 50 can be a chain, cable, rope or any suitable means for tethering (securing) the cargo stop 10 to the angle bar 40 at the front of the trailer compartment. In the embodiments illustrated in FIGS. 1 and 3-5, the tethering means is a chain 50 and has a first end anchored to a steel angle bar 40 located near the trailer front wall 74 and, in FIG. 1, a second end secured to the cargo stop 60. The chain 50 should be long enough to extend longitudinally along the trailer floor 72 and under the carts 60 to the cargo stop 10 with some excess chain left over.

Figure 2:
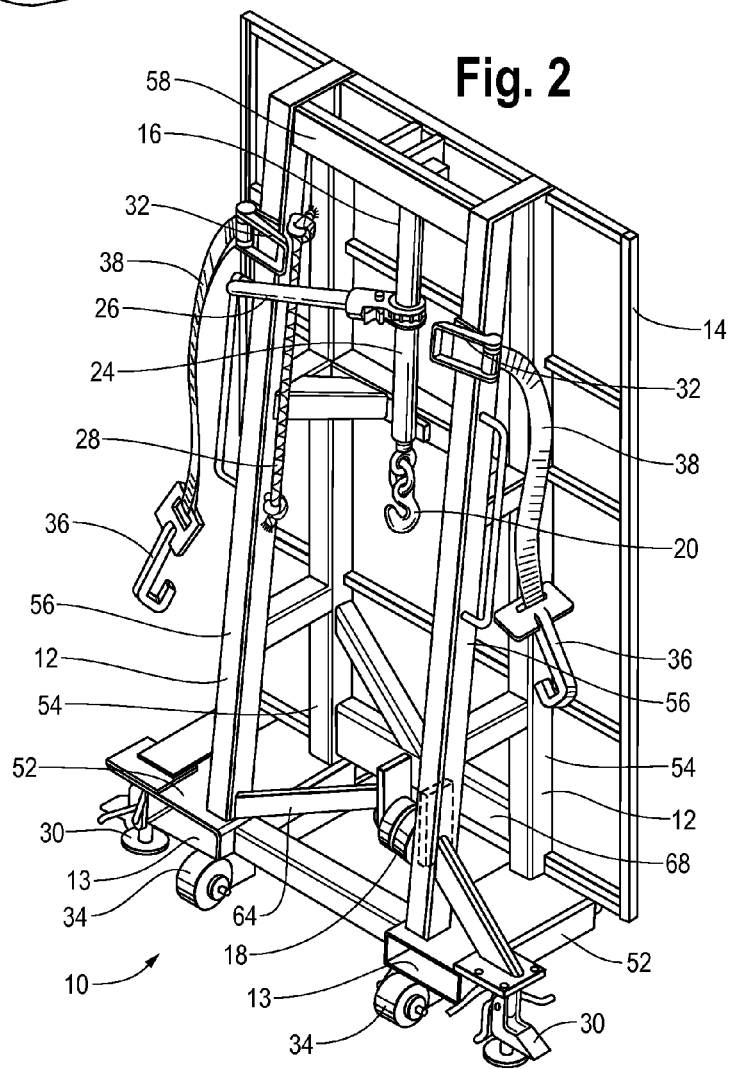
FIG. 2 is a detailed perspective view of the cargo stop of FIG. 1.

Referring to FIG. 2, the cargo stop 10 comprises a welded steel frame 12, a substantially flat vertically oriented backstop 14 mounted on the frame 12 on the side that will face the cargo, and a cinching mechanism 16 (FIG. 6) for tightening the chain 50 after the cargo stop 10 has been placed behind the row of carts 60. A pulley 18 is mounted to the lower center portion of the frame 12 and is used as explained below. The cargo stop frame 12 is mounted on wheels or casters 34 so the cargo stop 10 can be easily moved into position behind the row of carts 60. (A typical cargo stop might weigh about 335 lbs.)

In the illustrated embodiment the frame 12 comprises a pair of opposed horizontal rectangular beams 52, a vertical post 54 extending perpendicularly upward from a forward end of each beam 52, and a diagonal post 56 running diagonally from a rearward portion of each rectangular beam 52 to a position adjacent each vertical post 54 to form two A-frame structures. A cross bar assembly 58 extends between the A-frame structures near the top of the A-frames. The backstop 14 is mounted to the vertical posts 54 and comprises a solid flat panel or metal screen or similar structure which abuts the carts 60 or other cargo. The rectangular beams 52 define fork openings or channels 13 to accommodate the forks 18 of a forklift truck so the cargo stop 10 can be lifted and placed inside the trailer 70.

Figure 14:
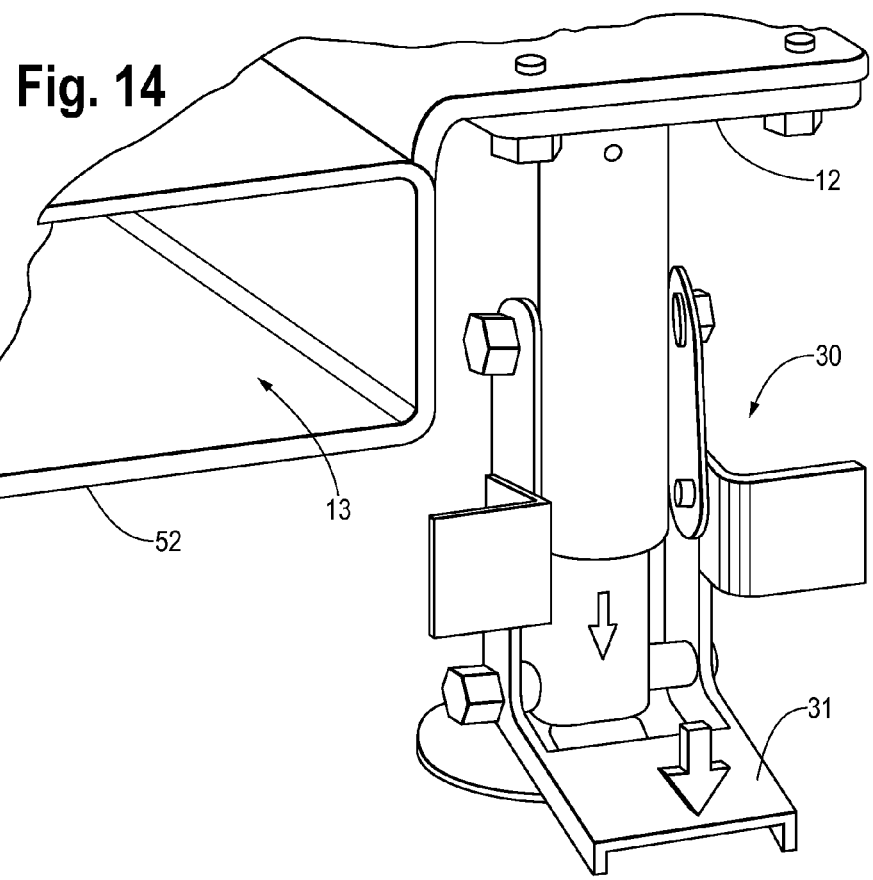
FIG. 14 is a close up perspective view of a foot brake for a cargo stop similar to that shown in FIG. 2.

As shown in FIG. 1 and again in FIG. 14, foot stops or brakes 30 may be mounted to either side of the cargo stop 10, preferably to the rectangular beams 52, and are used to immobilize the cargo stop 10. The foot brakes are conventional in design and may be engaged and disengaged by pressing down on a foot pedal or plate 31.

The cinching mechanism 16 used to tighten the chain 50 is suspended from the cross bar assembly 58 equidistant the A-frame structures. As best shown in FIGS. 6-8, the cinching mechanism 16 comprises a turnbuckle hook 20, a pair of vertically aligned, threaded rods 22a, 22b connected by a turnbuckle 24, and a two way or reversible ratchet mechanism 27 for raising and lowering the turnbuckle hook 20. The turnbuckle hook 20 is suspended from the lower rod 22b. The upper threaded rod 22a is connected to the top of the frame 12 and, more particularly, to the cross beam assembly 58. The turnbuckle 24 is threadably connected to both portions 22a, 22b of the threaded rod and can be rotated to raise or lower the turnbuckle hook 20, thereby tightening or loosening the chain 50.

FIG. 6 shows an operator placing the chain 50 on the turnbuckle hook 20. As shown in this figure, the chain is partially wrapped around the pulley 18 and then suspended from the turnbuckle hook 20. Excess chain 50 may be laid on the floor rearward of the cargo stop 10. The pulley 18 is mounted to the cargo stop frame 12 between the A-structures near the bottom of the cargo stop 10. In the illustrated embodiment the pulley 18 is mounted on an axle supported between two plates 63. Each plate is mounted to a lower cross brace 68 and further secured by a diagonal cross brace 64.

FIG. 7 shows an operator turning the ratcheting handle 26 to raise the turnbuckle hook 20, thereby tightening the chain 50. FIG. 8 shows an operator adjusting the pawl to set the ratcheting mechanism. As best shown in these two figures, the reversible ratchet mechanism 27 is affixed to the turnbuckle 24 and comprises a gearwheel 60 having a bore through which the turnbuckle 24 extends in secure (non-slipping) fashion, a ratcheting handle 26 rotatably affixed to the gearwheel 60, and a pawl 62 pivotably affixed to the ratcheting handle 26. By pivoting the pawl 62 the ratchet mechanism 27 can be set to rotate the turnbuckle either clockwise or counterclockwise to either tighten or loosen the chain 50.

FIG. 9 is a close up perspective view of the pulley 18 and chain 50. The links of the chain 50 may be configured to fit snugly around the pulley 18.

The cargo stop 10 also comprises means for securing the cargo stop 10 to a cart 60 or, more particularly, the last cart 60 in a row of carts 60. The securing means comprises a strap 38 affixed to either side of the cargo stop frame 12 by a winch 32, each strap 38 having a cart hook 36 attached to the free end of the strap 38.

Figure 13:
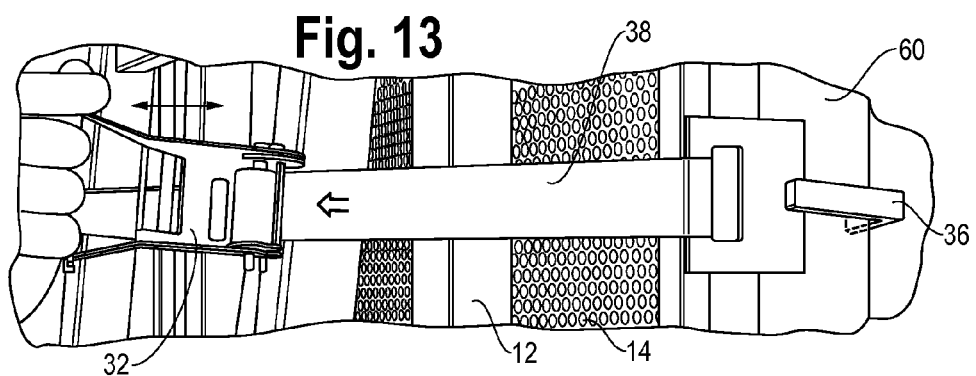
FIG. 13 is a close up perspective view of the right side securement means of FIG. 11 being tightened with a winch.

FIG. 10 is a close up perspective view of the right side securement means, and shows an operator placing the right cart hook 36 around a vertical upright of a cart 60. FIG. 10A shows the cart hook 36 after it has been placed around the cart 60. The cart hook 36 should have a J- or U-shape to fit around the vertical cart support 60. As shown in FIG. 13, after the cart hook 36 has been placed around the cart 60, the operator snugs (tightens) the right strap 38 by pulling the winch 32 in a direction away from the right cart hook 36.

Figure 12:
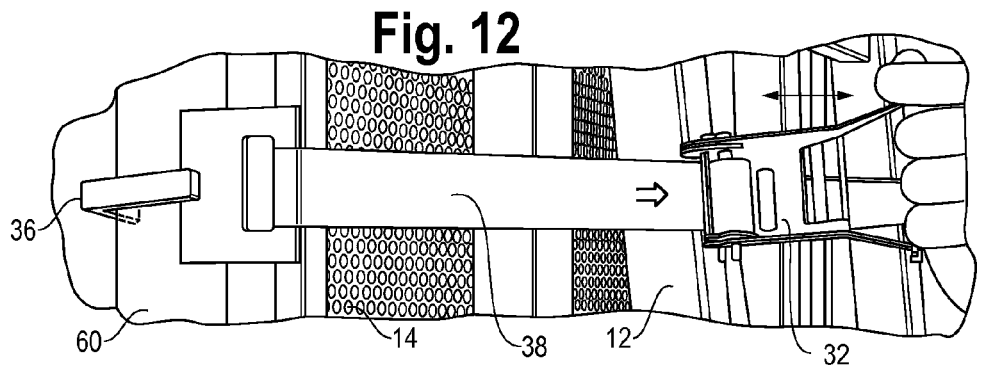
FIG. 12 is a close up perspective view of the left side securement means of FIG. 11 shown being tightened with a winch.

Likewise, FIG. 11 is a close up perspective view of the left side securement means, and shows an operator placing the left cart hook 36 around the vertical upright of a cart 60. FIG. 11A shows the cart hook 36 after it has been placed around the cart 60. As shown in FIG. 12, after the cart hook 36 has been placed around the cart 60, the operator snugs (tightens) the left strap 38 by pulling the winch 32 in a direction away from the left cart hook 36.

Referring to FIG. 3, the chain 50 is anchored near the trailer front wall 74 by a section of steel angle bar 40. The angle bar 40 preferably has a cross section configured like a right triangle, and is mounted to the trailer floor 72 such that the third (hypotenuse) side of the angle bar faces forward, toward the trailer bulkhead 74. An end of the chain 50 may be secured to a horizontally mounted rod forming part of the angle bar 40. When not in use the chain 50 can be stored in a storage compartment (not shown) near the angle bar 40 or behind the angle bar 40 near the bulkhead 74 for safety. Preferably, the angle bar 40 is affixed to the trailer top plate and upper coupler (not shown). Depending on the arrangement, the foremost cart 60 may abut either the angle bar 40, the trailer front wall 74 or a front wall liner 90.

As shown in FIGS. 4 and 5, a front wall liner 90 may be used to protect the trailer front wall 74 from impacts with the carts 60. The front wall liner 90 comprises a sheet of plywood or other cushioning material and can be affixed to horizontal steel hat shaped beams 94 mounted to the front wall 74. In the illustrated embodiment the steel hat beams 94 are mounted to vertical wall posts 79.

EXAMPLE

The cargo securement system of the present invention may be used to secure one, two or possibly more parallel, longitudinal rows of carts 60 loaded onto a trailer 70. The following example describes how to secure a single row of carts 60.

Step 1: Cargo Stop Check

First, before loading the trailer the operator should check the cargo stop 10 to make sure it is ready to use. Part of this preparation includes twisting the turnbuckle 24 by hand to ensure that the ratcheting handle 26 is set to raise (not lower) the turnbuckle hook 20. The turnbuckle screw threads should be adjusted until the turnbuckle is about evenly threaded onto the top and bottom rods 22a, 22b. Preferably about 8-10 inches of threaded rod will show at both ends of the turnbuckle 24. The last two inches of each threaded rod 22a, 22b may be painted to alert the operator when the turnbuckle 24 is close the end of the threaded rod 22a, 22b. The ratcheting handle 26 should be secured by a securing strap 28.

Step 2: Positioning the Chain

Next, with the trailer 70 still empty, the chain 50 is removed from its storage compartment near the trailer front wall 74 and pulled along the trailer floor 72 until it extends the desired distance from the front wall 74. The distance should exceed the expected total length of a row of lined up cargo carts 60.

Step 3: Loading the Carts

The carts 60 are loaded onto the trailer 70 and positioned so that they form a longitudinally aligned group of carts 60 with the chain 50 extending under each cart 60 and between each pair of front and rear wheels 62. Preferably the carts 60 have fork openings 63 near the bottom of the carts to accommodate the forks 80 of a forklift truck (FIG. 4) for easier loading. The carts 60 should be arranged front to back and as close to each other as possible.

Step 4: Positioning the Cargo Stop

Next the cargo stop 10 is picked up and loaded onto the trailer 70 with a forklift truck and centered behind (at the rear of) the row of carts 60 with the chain centered underneath the cargo stop 10. The forklift truck can then be backed out of the trailer 70.

Step 5: Setting and Hand Tightening the Chain

The operator then pulls the chain 50 up around the pulley 18 located at the bottom of the cargo stop 10 and hooks the chain 50 firmly over the turnbuckle hook 20 as shown in FIG. 6. The chain 50 is then hand tightened by the operator, either by rotating the turnbuckle 24 by hand or by ratcheting the ratcheting handle 26 to lightly secure the cargo stop 10 against the row of carts 60.

Step 6: Securing the Cargo Stop to the Cart

For added stability, prior to firmly securing the cargo stop 10 against the row of carts 60, the cargo stop 10 should be secured to the last cart 60 with the two cart hooks 36 suspended from the straps 38 attached to either side of the frame 12. To do this the cart hook 36 nearest the trailer side wall 76 is first attached to (hooked around a vertical post of) the last cart 60 (see FIGS. 10 and 10A). The strap 38 should be pulled snug so that the cart hook 36 is securely attached to the cart 60 and not damaging the product. Finally the strap 38 is drawn tight by pulling on the winch 32 (see FIG. 13).

The same procedure should be used on the other side of the cargo stop 10. The cart hook 36 farthest the trailer side wall 76 (the "trailer middle side") is hooked around the other vertical post of the last cart 60 and the strap 38 is pulled snug so that the cart hook 36 is securely attached to the cart 60 and not damaging the product (see FIGS. 11 and 11A). Finally the strap 38 is snugged tight using the winch 32 (see FIG. 12).

Step 7: Tightening the Chain with the Ratcheting Handle

With the cargo stop 10 secured to both sides of the last cart 60, the ratcheting handle 26 is released from the securing strap 28 and turned in ratcheting fashion to tighten the chain 50 until the chain 50 and cargo are very snug. The ratcheting handle 26 should then be secured in place by the securing strap 28. As shown in FIG. 14 the foot brakes 30 can be set to further immobilize the cargo stop 10. In this way the cargo carts 60 are restrained (wedged) between the cargo stop 10 and the trailer front wall 74, or front wall liner 90.

Unloading the Trailer

To unload the trailer 70, the operator releases the ratcheting handle 26 from the securing strap 38 and reverses the ratcheting handle 26 direction using the ratchet mechanism 27 shown in FIG. 8. The turnbuckle hook 20 is lowered by rotating the turnbuckle 24 until the chain 50 is loose and can be easily removed from the hook 20. The winch 32 on one side of the cargo stop 10 is released and the strap 38 loosened until the cart hook 36 can be released from the cart 60. This procedure is repeated on the other side.

Any excess chain 50 should be laid straight under the carts 60 to facilitate the removal of the carts 60 from the trailer 70 and, if appropriate, reloading the trailer. The cargo stop brakes 30 are released and the cargo stop 10 is be removed from the trailer 70 with a fork lift truck if desired before unloading the cargo.

Securing the Empty Trailer

Before moving the trailer with a cargo stop 10 aboard, the chain 50 should be loaded into its storage compartment near the trailer front wall 74. The cargo stop 10 or stops 10 can then be secured to the trailer bulkhead 74 with a load strap (not shown in the figures). The load strap should be placed between the vertical and diagonal posts 54, 56 of the cargo stop(s) 10, and the cargo stop foot brakes 30 should be engaged.

It should be understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

We claim as our invention:

1. An apparatus for restraining one or more carts within a trailer, the trailer having a floor and a front wall, the apparatus comprising:
    a mobile cargo stop comprising a frame and a backstop mounted on the frame;
    tethering means having a first end anchored at or near the front wall and capable of extending longitudinally along the trailer floor from at or near the front wall and under the carts to the cargo stop;
    a cinching mechanism mounted on the frame for tightening the tether means so that the carts are restrained between the front wall and the cargo stop.

2. The apparatus of claim 1 wherein the cinching mechanism comprises:
    upper and lower vertically aligned threaded rods, the upper threaded rod being connected to the frame;
    a turnbuckle interposed between and threadably connecting the threaded rods;
    a turnbuckle hook suspended from the lower rod for attaching to the tethering means; and
    a ratchet mechanism affixed to the turnbuckle and comprising a ratcheting handle;
    wherein the turnbuckle can be rotated by turning the ratcheting handle to raise or lower the turnbuckle hook, thereby tightening or loosening the tethering means.

3. The apparatus of claim 1 further comprising an anchoring device to which the tethering means is anchored, the anchoring device being affixed to the trailer near the front wall.

4. The apparatus of claim 3 wherein the tethering means is a chain.

5. The apparatus of claim 1 wherein the cargo stop further comprises:
    a strap adjustably affixed to each side of the frame; and
    a cart hook affixed to an end of each strap and configured to grip a cart.

6. The apparatus of claim 1 further comprising a front wall liner mounted to the front wall to protect the front wall from impacts with the carts.

7. A method of securing one or more carts within a trailer, the trailer having a floor and a front wall, the method comprising the steps of:
    a. positioning a tethering means having a first end anchored at or near the front wall along the trailer floor so that the tethering means extends rearward a distance from the front wall;
    b. loading one or more carts having a front side and a back side onto the trailer and positioning the carts in front to back fashion so that the carts form a longitudinally aligned row of carts with the tethering means extending under each cart;
    c. providing a cargo stop having a frame, a backstop mounted on the frame, and a cinching mechanism for tightening the tethering means mounted on the frame, and positioning the cargo stop so that the cargo stop is longitudinally aligned with the row of carts with the tethering means substantially centered underneath the cargo stop;
    d. connecting the tethering means to the cinching mechanism;
    e. tightening the tethering means until the carts are snugly restrained between the front wall and the cargo stop.

8. The method of claim 7 wherein the connecting step comprises placing the tethering means on a turnbuckle hook and the tightening step comprises turning a ratcheting handle to raise the turnbuckle hook.

9. The method of claim 7 wherein, prior to the connecting step, the method comprises the step of securing the cargo stop to one of the carts.

* * * * *